United States Patent Office 3,155,583
Patented Nov. 3, 1964

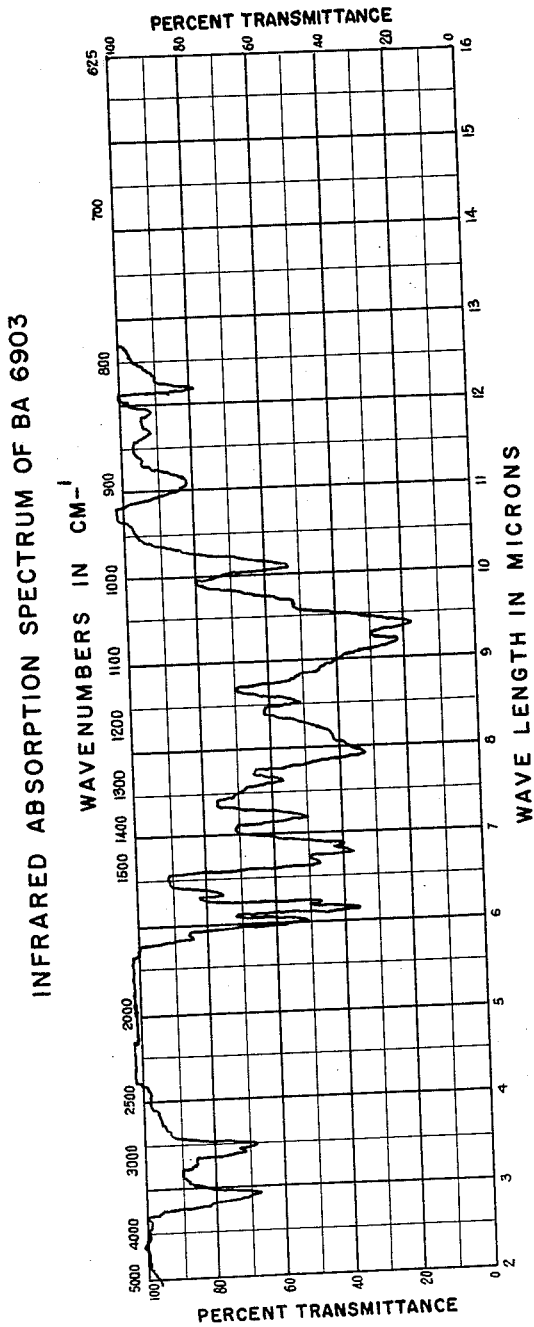

3,155,583
ANTIBIOTIC NARANGOMYCIN AND METHOD OF PRODUCTION
Koppaka V. Rao, Pinebrook, and William S. Marsh, Wanaque, N.J., and Samuel C. Brooks, Jr., Grosse Pointe, Mich., assignors to Chas. Pfizer & Co., Inc., New York, N.Y., a corporation of Delaware
Filed May 18, 1962, Ser. No. 198,402
12 Claims. (Cl. 167—65)

This invention relates to the cultivation under controlled conditions of a new microorganism Streptomyces sp. (ATCC No. 13306), to the biologically active substance produced thereby, to methods for the recovery and concentration from crude solutions, including the fermentation broths, and to methods of purification of this biologically active substance designated as narangomycin.

This invention specifically relates to a new and useful fermentation product called narangomycin, in both its crude and purified forms, and to methods for the preparation, concentration and isolation of this substance. Narangomycin is useful in inhibiting the growth of malignant tumors in animals. It also possesses useful antimicrobial activity against Trichomonas vaginalis and a variety of yeasts and yeast-like organisms which make possible important applications in therapeutic and industrial fermentations.

The newly discovered microorganism employed in the valuable process of the present invention, isolated from a soil sample obtained from Malaya, was found to have characteristics of a member of the genus Streptomyces. For complete classification it was planted in replicates of 6 on media normally used for identification of such microorganisms and incubated at the proper temperatures for four weeks. Readings of the media were made at appropriate times and final records were made after four weeks of incubation in the accepted fashion. A culture of the microorganism has been deposited in the American Type Culture Collection, Washington, D.C., and added to its collection of microorganisms as ATCC No. 13306.

The description and identification of this new microorganism, designated isolate BA–6903, in the culture collection of Chas. Pfizer & Co., Inc., of New York, New York, was supplied by Dr. J. B. Routien. The cultural characteristics of the new microorganism are set forth in Table I:

TABLE I

*Cultural Characteristics of Isolate BA–6903*

| Medium | Amount of Growth | Aerial Mycelium and Sporulation | Soluble Pigment | Remarks |
| --- | --- | --- | --- | --- |
| Pridham's Yeast Extract | Good to excellent | Abundant; white to light brown; developing some lavender-gray color after one month. | Lacking | Vegetative mycelium not visible; reverse brown; sporophores mostly opposite or in whorls, scattered along hyphae; terminating in loose clusters of a few nearly straight chains of spores; spores oblong to rectangular, 0.65 x 1.3µ. |
| Skimmed Milk | do | Essentially lacking | Pale coral | Coagulation and peptonization of half of the milk; pH changed from 6.3 to 6.8. |
| Glucose Agar | Good | Good; white | Very pale yellowish brown. | Vegetative mycelium not visible; reverse light buff to brown. |
| Nutrient Agar | Moderate | Scant; white | Lacking | Vegetative mycelium light buff color; reverse pale buff color. |
| Synthetic Agar | Growth lacking on two slants, poor on one, poor to moderate on another. | Moderate; cream-colored. | do | Vegetative mycelium not visible; reverse very pale cream color. |
| Calcium Malate Agar | Very poor, almost lacking. | Lacking | do | Vegetative mycelium pale buff; reverse not visible; malate not digested. |
| Cellulose | No growth | | | Weak color reaction of nitrates. |
| Dextrose-Nitrate Broth | Good, in pellicle | Good; pinkish-tan | do | |
| Potato Plugs | Excellent | Abundant; creamy color, developing some lavender gray color after one month. | Very pale brown | Vegetative mycelium not visible; reverse pale brown. |
| Emerson Agar | Good | Good; cream-colored, developing some lavender gray color after one month. | do | Do. |
| Gelatin Plates | Colonies small | Lacking | Lacking | Vegetative mycelium tan to brown; no liquefaction. |
| Starch Plates | Growth poor | Abundant; cream color | do | Reverse buff; no hydrolysis. |
| Glucose-Asparagine Agar | Good to excellent | Abundant; cream colored, developing some lavender-gray color after one month. | do | Vegetative mycelium not visible; reverse brown in center, paler toward edge, colony flat or with raised sectors. |

This culture, Isolate BA–6903, could not be identified as any species of Streptomyces heretofore described. It appears to be a new species for which the name *Streptomyces lavenduligriseus* is proposed. Culture BA–6903, deposited at the American Type Culture Collection as ATCC 13306 is designated the type culture.

It is to be understood that the present invention embraces the use, not only of the organism of the above description, which is given merely for illustrative purposes; but it also embraces the use of mutants produced from the described organism by means such as X-ray irradiation, ultraviolet irradiation, treatment with nitrogen mustards and the like. It is further to be understood that the invention includes the use of subcultures obtained by various standard microbiological techniques, such as the single colony and single spore isolation methods. Such mutants and/or subcultures may differ in certain respects from the above described new microorganism. It also includes the use of organisms of this strain isolated from other sources.

Narangomycin is remarkably effective in treating a number of infections and malignancies. It exhibits significant activity against a wide variety of microorganisms. However, it is particularly noteworthy in its action on Gram-positive organisms. While it demonstrates some activity against Gram-negative organisms, this activity is generally of a somewhat lower level. The following table demonstrates the antibiotic spectrum of narangomycin against a variety of Gram-positive and Gram-negative microorganisms. These tests were run by seeding nutrient broth containing various concentrations of the pure antibiotic with the particular organism specified. The "minimum inhibitory concentration" (MIC) indicated in Table II is the minimum concentration of antibiotic (in micrograms/milliliter) at which growth of the microorganisms failed to occur.

Since the highest concentration employed was 100 mcg./ml., the "minimum inhibitory concentration" is not precisely stated where such concentrations apparently exceeded 100 mcg./ml. The tests were conducted under standardized conditions.

TABLE II

*Antibacterial Activity of Narangomycin*

Microorganism: MIC. mcg./ml.
  Gram-negative—
    Salmonella typhosa _____ 100
    Aerobacter aerogenes _____ 100
    Escherichia coli _____ 100
    Proteus vulgaris _____ 100
    Pseudomonas aeruginosa _____ 100
  Gram-positive—
    Streptococcus pyogenes _____ 1.56
    Diplococcus pneumoniae _____ 6.25
    Micrococcus pyogenes var. aureus _____ 1.56
    Micrococcus pyogenes var. aureus 376 _ 1.56
    Micrococcus pyogenes var. aureaus 376 _ 1.56
    Micrococcus pyogene var. aureus 20–B _ 1.56
    Micrococcus pyogenes var. aureus 23 __ 1.56
    Micrococcus pyogenes var. aureaus 33 _ 1.56
    Micrococcus pyogenes var. aureus 34
      Aq. _____ 1.56

The new antibiotic was also found to be highly effective against the human pathogen *Trichomonas vaginalis*. Its pathogenic activity suggests its use in the treatment of *Trichomonas vaginitis*.

Narangomycin is effective in treating a number of infections and malignancies. For this purpose either the pure material or one of the crude forms of the valuable product may be employed. This includes either a filtered fermentation broth prepared from Isolate BA–6903, or a solid or liquid concentrate obtained therefrom. Such preparations should be of sufficient potency to provide a daily dose to the host equivalent to at least about 0.5–2.0 mg./kg. of body weight of pure narangomycin. For administration to animals, a non-toxic carrier, of course, is selected. By non-toxic is meant a carrier which is non-toxic when administered in a quantity sufficient to provide the above dose of narangomycin. This may be a pharmaceutical carrier, either a liquid or solid such as water, aqueous ethanol, syrup, isotonic saline or glucose, starch, lactose, calcium phosphate, etc., an animal feed stuff or a mixture of various materials as occurs in a filtered fermentation broth. Either oral or parenteral administration is satisfactory. The parenteral route is perhaps preferred until a satisfactory regimen adapted to the patient is developed.

To illustrate the antitumor activity of the present substance, the percent inhibition of a number of tumors of mice by various forms of narangomycin was determined. The fermented broths show a substantial degree of activity against Sarcoma 180 and Carcinoma 755 in mice after a suitable dilution, generally at 1–4. The inhibition is generally about 50%.

In each experiment, mice of the same sex were employed. The tumor transplant was made employing the line of Sarcoma 180 and Carcinoma 755 obtained from the Southern Research Institute, Birmingham, Alabama. Tumor fragments of from 1 to 2 mm. dimensions were cut from non-necrotic portions of the donor tumor and implanted into the axillary region of each test mouse. Injections of the drum were begun 24 hours after tumor implantation and continued two times daily for seven days in the treatment of Sarcoma 180 and once daily for twelve days in the treatment of Carcinoma 755. The animals were weighed at regular intervals during the tests to provide a measure of the toxic effects of the drug. Twenty-four hours after the last injection, the animals were sacrificed and the tumors excised and weighed. The results of this test employing, as source of narangomycin, a filtered fermentation broth and pure narangomycin prepared in accordance with this invention, and administered according to the above schedule, are presented in Table III.

TABLE III

| Sample | Dose, mg./kg. | Number of Survivals | Percent of Control Tumor | Type of Tumor |
|---|---|---|---|---|
| Broth | 1–4 | 4/6 | 40 | S–180 |
| Narangomycin | 1.0 | 7/7 | 51 | S–180 |
|  | 3.0 | 3/6 | 56 | S–180 |
|  | 1.0 | 10/10 | 42 | CA–755 |
|  | 1.5 | 6/10 | 57 | CA–755 |
|  | 1.0 | 10/10 | 47 | CA–755 |
|  | 0.5 | 10/10 | 51 | CA–755 |

In the therapy of tumors narangomycin can advantageously be used in combination with one or more other carcinostatic agents. For this purpose, compositions containing from 10–90% of active ingredient, narangomycins by weight are useful. Known carcinostatic agents which can be employed with narangomycin in such compositions are the nitrogen mustard type carcinostats, 6-mercaptopurine, 8-azaguanine, urethane, 6-diazo-5-oxo-1-norleucine (DON), azaserine, triethylenemelamine, mitomycin C, triethylenephosphoramide, 1,4-dimethylsulfonyloxybutane, the carcinostatic folic acid analogs, and the like.

Narangomycin possesses a high degree of activity against *B. subtilis* if the latter is grown on a synthetic medium of the following composition: dipotassium phosphate 7 g./l., monopotassium phosphate 3 g./l., sodium citrate 0.5 g./l., magnesium sulfate 0.1 g./l., ammonium sulfate 1 g./l., glucose 2.0 g./l.

The present invention embraces the process for growing *Streptomyces lavenduligriseus* (ATCC No. 13306), Isolate BA–6903, under controlled conditions to produce narangomycin. The culture is grown submerged in an aqueous nutrient medium containing 10 g./l. of cerelose, 15 g./l. of soybean meal, 2.5 g./l. of distillers' solubles, 2 g./l. of sodium chloride, 5 g./l. of dipotassium phosphate, and 2 g./l. of calcium carbonate. The medium is adjusted to pH 7.0, the calcium carbonate added and the broth sterilized. It is inoculated with 2–5% of a 48 hour old culture grown in the same medium. Fermentation is carried out at 26–30° C. in 4 liter stirred glass jars and 150 gallon tanks, mechanically aerated, for from about 50–70 hours. Progress of the fermentation is followed by standard plate assay methods using *B. subtilis* grown on a synthetic medium of the type previously described.

The culture is maintained on agar slants which are made from a medium of the following composition: 10 g./l. of maltose, 5 g./l. of tryptone, 1 g./l. of potassium acid phosphate, 1 g./l. of sodium chloride and 0.2 g./l. of ferrous sulfate heptahydrate.

For the recovery and preparation of concentrates of narangomycin the beer is filtered with the aid of Hyflo Supercel, the broth adjusted to pH 4.0 and extracted with ½ volume of ethyl acetate. The extract is clarified, concentrated to a small volume and the concentrate poured into 5 volumes of petroleum ether. The mycelial cake is extracted with methanol, the extract concentrated and then extracted with ethyl acetate at pH 4.0. The ethyl acetate extract is concentrated and processed in the same manner as the extract from the broth.

The crude concentrate is purified by dissolving in ethyl acetate followed by passage through a column of acid washed alumina and elution with ethyl acetate containing 2% methanol. The progress of the column is followed by activity against *B. subtilis*. The fractions having the highest activity are combined, concentrated and the antibiotic recovered. Countercurrent distribution of the above product in the system methanol-water-chloroform-ligroin permits recovery of the pure antibiotic. Pure narangomycin has a distribution coefficient of 0.3 and crystallizes as bright lemon yellow rectangular prisms melting at 201° C. to 203° C.

It is only slightly soluble in water (less than 50 γ/cc.) more soluble in lower alcohols, acetone, ethyl acetate, chloroform and benzene. In aqueous alkali it gives bright yellow solutions. Addition of acid precipitates the antibiotic. With alcoholic ferric chloride, a characteristic dark greenish-brown color is produced. It exhibits a characteristic ultraviolet absorption spectrum with maxima at 232, 275 and 363 mu with extinction coefficients of 308, 336 and 168 respectively. When dissolved in chloroform a number of characteristic peaks appear in the infrared region, the more significant of which occur at the following frequencies expressed in reciprocal centimeters; 3436, 2924, 2865, 1709, 1667, 1656, 1629, 1610, 1585, 1502, 1471, 1451, 1387, 1309, 1261, 1171, 1088, 1064, 988, 902, 855, 840, 820. The infrared absorption spectrum is shown in the accompanying drawing.

It is a phenolic bright lemon-yellow organic compound unusually stable in alkaline solutions and forms well defined sodium and potassium salts which are quite soluble in water. The compound has been analyzed and found to contain the following elements in the proportions by weight specified:

Carbon _____ 59.73
Hydrogen _____ 6.15
Oxygen (by difference) _____ 34.12
Methoxyl _____ 7.01
C-methyl _____ 6.18

This corresponds to the probable empirical formula:

$$C_{23}H_{30}O_{10}$$

It contains no nitrogen, sulfur or halogens. Useful salts of the antibiotic can be prepared by methods well known in the art as by treatment of the compound with an appropriate base in aqueous solutions. For example, the sodium or potassium salts can be prepared by dissolving some of the antibiotic in a sufficient amount of aqueous sodium or potassium hydroxide and freeze drying to obtain the desired salt. The free antibiotic can be regenerated from its alkali metal salts by treatment with acid.

The following examples are given by way of illustration and are not to be construed as a limitation of this invention many variations of which are possible without departing from the spirit or scope thereof.

EXAMPLE I

Approximately 10 liters of a fermentation broth having the following composition was prepared and the batch adjusted to pH 7.

| | G./l. |
|---|---|
| Cerelose (dextrose hydrate) | 10 |
| Soybean meal | 15 |
| Distillers' solubles | 2.5 |
| Sodium chloride | 2 |
| Dipotassium phosphate | 5 |
| Calcium carbonate | 2 |

The broth was then distributed to a number of 1 l. Erlenmeyer flasks each containing approximately 225 ml. of the medium, and the flasks with contents sterilized by autoclaving for 20 minutes at 15 lbs. steam pressure (121° C.). The inoculum was prepared by transferring the growth of a well sporulated slant of *Streptomyces lavenduligriseus* ATCC No. 13306 to a flask of the above medium and incubating the same at 28° C. for 50 to 70 hours on a rotary shaker. Two such inoculum flasks were prepared. The remaining flasks containing the sterile broth were then inoculated with about 5% of their volume of the inoculum so prepared and incubated by shake culture at 28° C. for 65 hours. The finished beer was then filtered over glass wool and the clear filtrate passed thorugh a bed of Hyflo Supercel. This filtrate was found to possess from about 4–8 *B. subtilis* dilution units of activity per milliliter by the standard plate assay.

This filtered fermentation broth was capable of inhibiting Sarcoma 180 in mice when diluted 4-fold with physiological saline. Similar tumor-bearing mice were treated with physiological saline as controls. The results are given in Table IV. It is apparent from this table that appreciable tumor control resulted from this treatment.

TABLE IV

*Tumor Inhibition With Diluted Broth*

| Sample | Percent of Control | Type of Tumor |
|---|---|---|
| Broth (1-4 dilution) | 52 | S-180 |
| Physiological saline (control) | None | S-180 |

EXAMPLE II

Approximately 10 l. of fermentation broth prepared as described in Example I was extracted at pH 4 with 5 l. of ethyl acetate. The spent broth was almost inactive on both the *B. subtilis* plate assays. The ethyl acetate extract on the other hand contained highly active material for each assay. The solvent extract was clarified, concentrated to a small volume under reduced-pressure at 35–40° C. (to about 1/50 of its original volume). The residue was then poured into 5 volumes of high-boiling (B.P. 60–90° C.) petroleum ether. The solid which precipitated was collected. The mycelial cake was extracted with methanol, the extract concentrated, and the concentrate extracted at pH 4 with ethyl acetate. The ethyl acetate extract was concentrated and processed in the same manner as the extract from the broth. This partially purified narangomycin composition was used in the treatment of Sarcoma 180 andu Carcinoma 755 tumors by dissolving in water, or physiological saline at a concentration of from 0.2 to 0.5 mg./ml. and administering at a dosage of 10 to 25 mg./kg. subcutaneously to host animals bearing the above tumors. Growth of these tumors was inhibited to an extent of approximately 50% compared to untreated controls.

EXAMPLE III

A more purified narangomycin concentrate was prepared from the product of Example II. A 10 inch chromatographic column 3½ in. in diameter was prepared containing 2 to 2.5 kg. of acid-washed alumina (Merck). The crude product of Example II (100 g.) was then dissolved in ethyl acetate to give a 2 to 3% solution and this solution percolated through the column. The resulting chromatogram was developed by passing fresh ethyl acetate through the column. Approximately 12 l. of ethyl acetate was used for development. The eluate was collected in 500 cc. fractions; the solvent evaporated from each fraction; and the progress of the development followed by the anti B. subtilis assay of each fraction. The residues showing the highest activity were then combined and checked for antitumor activity. In doses of 0.5 to 2.0 mg./kg. it inhibited the growth of Sarcoma 180 and Carcinoma 755 to the extent of approximately 50% compared to untreated controls.

In other runs, elution of the alumina column with ethyl acetate containing 1 to 2% methanol on a weight basis gave equivalent results.

EXAMPLE IV

A pure crystalline sample of narangomycin was prepared from the concentrate of Example III by countercurrent distribution in the system methanol-water-chloroform-ligroin (3:1:3:1). The fractions with the highest activity as shown by their anti B. subtilis activity were combined and concentrated. From the concentrate narangomycin crystallized as bright lemon-yellow rectangular prisms; M.P. 201–203° C. It exhibited absorption maxima in the ultra-violet region of the spectrum at 232, 275 and 363 mu;

$E_{1cm.}^{1\%} = 308$, 336 and 168, respectively

*Analysis.*—Found: C, 59.74, 59.73; H, 6.18, 6.15; O (by difference), 34.08, 34.12.

It is only slightly soluble in water (50γ/cc.) and much more soluble in buffer systems having a pH above 7. It is moderately soluble in lower alcohols, acetone, ethyl acetate, chloroform and benzene. In aqueous alkali bright yellow solutions are formed from which, upon addition of acids, the compound can be reprecipitated. That the compound contains a phenolic moiety is evidenced by the formation of a characteristic dark green-brown color with alcoholic ferric chloride. Characteristic absorption maxima in the infrared appear at the wavelengths tabulated herein.

The pure compound demonstrated substantial activity against Sarcoma 180 and Carcinoma 755 tumors in mice. Even at dosages of 0.5 to 2.0 mg./kg. 48 to 61% inhibition of tumor growth was obtained.

EXAMPLE V

The potassium salt of narangomycin was prepared by adjusting the pH of an aqueous suspension of narangomycin to 10 with dilute potassium hydroxide and freeze drying the resulting yellow solution to isolate the potassim salt.

Alternatively, the potassium salt was prepared by adding the stoichiometric amount of potassium hydroxide to a methanolic solution of narangomycin and isolating the salt by precipitation with ether.

The potassium salt was also found to demonstrate substantial activity against Sarcoma 180 and Carcinoma 755 tumors in mice at dosages equivalent to that of pure narangomycin.

In like manner, the sodium, calcium and magnesium salts of narangomycin are prepared.

This application is a continuation in part of our application Serial No. 779,664, filed December 11, 1958, now abandoned.

What is claimed is:

1. A process for the production of narangomycin which comprises cultivating the microorganism *Streptomyces lavenduligriseus* (ATCC No. 13306) in an aqueous nutrient medium containing a carbohydrate and a source of organic nitrogen and inorganic salts under submerged aerobic conditions until substantial antimicrobial activity is imparted to said medium.

2. A process as claimed in claim 1 wherein the antibiotic substance is recovered from the fermentation broth.

3. A process for producing narangomycin which comprises cultivating *Streptomyces lavenduligriseus* in an aqueous nutrient medium containing a source of carbohydrate and a source of organic nitrogen and inorganic salts under submerged aerobic conditions at a temperature of from about 26° C. to about 30° C. for a period of from about 1 to about 4 days.

4. An antibiotic substance selected from the group consisting of narangomycin, an acidic phenolic compound, the crystalline form of which melts at about 201° to 203° C., is slightly soluble in water, more soluble in buffers having pH values greater than 7, and moderately soluble in lower alcohols, acetone, ethyl acetate, chloroform and benzene and which produces bright yellow solutions in aqueous alkali and a dark greenish-brown color with alcoholic ferric chloride, and capable of forming salts with bases; having absorption maxima in the ultraviolet region of the spectrum at 232, 275 and 263 mu with $E_{1cm.}^{1\%} = 308$, 336 and 168, respectively and when dissolved in chloroform exhibits characteristic adsorption in the infrared region at the following frequencies expressed in reciprocal centimeters: 3436, 2924, 2865, 1709, 1667, 1656, 1629, 1610, 1585, 1502, 1471, 1451, 1387, 1309, 1261, 1171, 1088, 1064, 988, 902, 855, 840, 820; whose dried crystalline form contains the elements carbon, hydrogen and oxygen and methoxyl and C-methyl groups in the following proportions by weight:

| | |
|---|---|
| Carbon | 59.73 |
| Hydrogen | 6.15 |
| Oxygen (by difference) | 34.12 |
| Methoxyl | 7.01 |
| C-methyl | 6.18 | and the metal salts of said substance.

5. Narangomycin, an acidic phenolic substance capable of forming salts with bases; which acidic substance is slightly soluble in water, more soluble in buffers having pH values greater than 7, and moderately soluble in lower alcohols, acetone, ethyl acetate, chloroform and benzene and which produces bright yellow solutions in aqueous alkali and a dark greenish-brown color with alcoholic ferric chloride, and capable of forming salts with bases; having absorption maxima in the ultraviolet region of the spectrum at 232, 275 and 363 mu with $E_{1cm.}^{1\%} = 308$, 336 and 168, respectively and when dissolved in chloroform exhibits characteristic absorption in the infrared region at the following frequencies expressed in reciprocal centimeters: 3436, 2924, 2865, 1709, 1667, 1656, 1629, 1610, 1585, 1502, 1471, 1451, 1387, 1309, 1261, 1171, 1088, 1064, 988, 902, 855, 840, 820; whose dried crystalline form contains the elements carbon, hydrogen and oxygen and methoxyl and C-methyl groups in the following proportions by weight:

| | |
|---|---|
| Carbon | 59.73 |
| Hydrogen | 6.15 |
| Oxygen (by difference) | 34.12 |
| Methoxyl | 7.01 |
| C-methyl | 6.18 |

6. An antibiotic composition containing at least about 0.05 micrograms per milligram of a product as claimed in claim 4 and a non-toxic carrier.

7. A solid antibiotic preparation comprised of a product as claimed in claim 4 and a non-toxic solid carrier.

8. A liquid pharmaceutical composition adapted for parenteral administration comprising a product as claimed in claim 4 and a liquid pharmaceutically acceptable carrier.

9. A process for treating infections caused by gram-positive microorganisms and minimizing the weight of tumors in mice which comprises administering thereto a daily dose of from 0.5 to 2.0 mg./kg. of body weight of said animal of a product as claimed in claim 4.

10. Alkali metal salts of the acidic substance defined in claim 5.

11. A sodium salt of the acidic substance defined in claim 5.

12. A potassium salt of the acidic substance defined in claim 5.

References Cited in the file of this patent

UNITED STATES PATENTS 2,999,048    Donovick _____ Sept. 5, 1961

OTHER REFERENCES

Reilly et al.: Cancer Research, September 1953, volume 13, No. 9, pages 684–687.

Yamaguchi et al.: J. Gen. Applied Microbiology, 1955, pages 201–205, 228–235.

Pridham et al.: Applied Micro Biology, 1958, pages 52–79, pages 52–56, 60, 61, 72, 73–75 are especially pertinent.